May 20, 1924.　　　　　J. L. MARTIN　　　　　1,494,615
TIRE MOLD
Filed Oct. 15, 1923
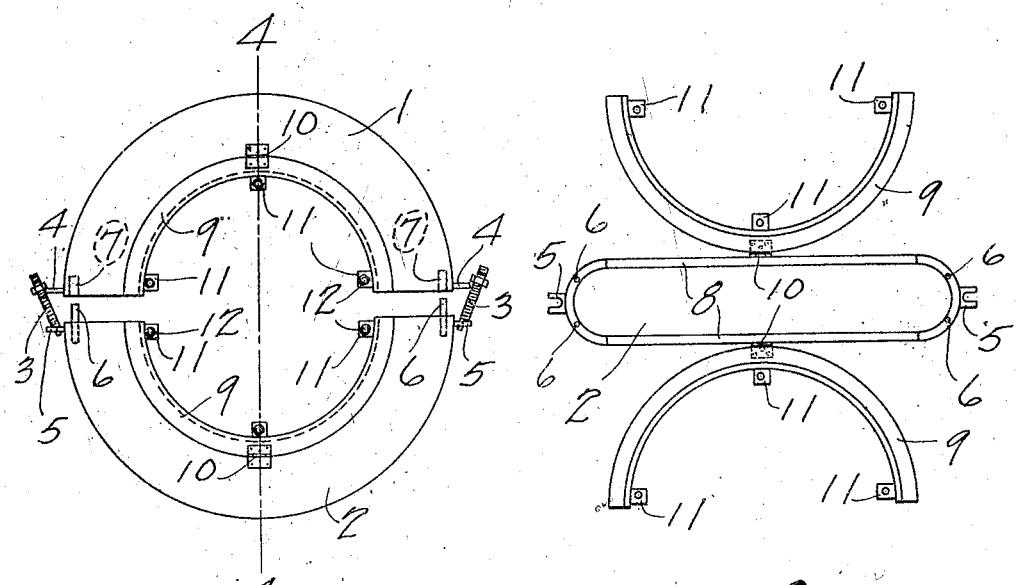
Fig. 1.
Fig. 3.
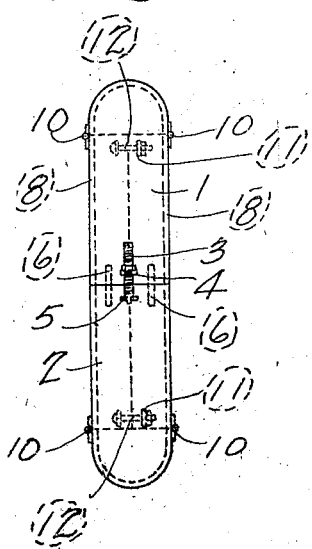
Fig. 2.
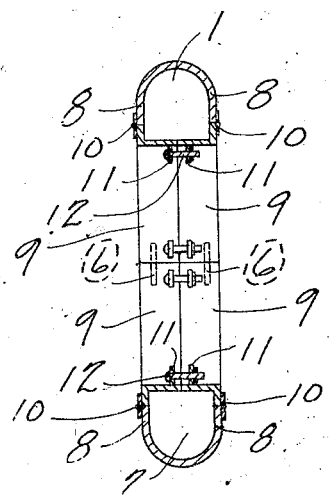
Fig. 4.
Inventor
James L. Martin
By Adam E. Fisher
J.G. Attorney Patented May 20, 1924.

1,494,615

UNITED STATES PATENT OFFICE.

JAMES L. MARTIN, OF COLORADO SPRINGS, COLORADO.

TIRE MOLD.

Application filed October 15, 1923. Serial No. 668,560.

*To all whom it may concern:*

Be it known that JAMES L. MARTIN, a citizen of the United States, residing at Colorado Springs, in the county of El Paso and State of Colorado, has invented certain new and useful Improvements in Tire Molds, of which the following is a specification.

This invention pertains to molds for molding and curing rubber tires or casings, or for repairing and rebuilding worn tires, and the object is to provide a simple and efficient form of mold of this character, and which it is thought will facilitate the kind of work described.

In the drawing—

Figure 1 is a side elevation of the molds assembled;

Figure 2 is an end or edge view;

Figure 3 is a plan view of a section, showing the parts of the mold opened out;

Figure 4 is a cross section on the line 4—4 in Figure 1.

The invention comprises two semi-circular half-molds 1 and 2, designed when properly locked together, to form a complete mold. These half-molds are adapted to be locked together by means of the bolts 3 engaging the peripheral lugs 4 and 5 rigidly attached to the half-molds 1 and 2 respectively. The half-molds 1 and 2 are held together in perfect alignment by means of dowel pins 6 on one of the molds engaging dowel sockets 7 on the other mold. Each half-mold in turn is made up of an outer shell or tread portion 8, and two semi-circular channel irons or bead irons 9, hinged at the medial points 10 to the said outer shells 8. The ends of the channel irons fall flush with the ends of the outer shells, when closed together. The channel irons are provided with bolt lugs 11 adapted to engage the draw bolts 12, for drawing and locking the channel irons together laterally for completing the perfect mold. These channel irons may be formed with any desired sort of beads, as may be desired on the completed tire, and any form of core or air bag may be employed, as may be desired.

The use and operation of the device is apparent.

While I have herein described a certain specific manner and method of constructing and assembling the elements of my invention, it is understood that I may vary from the same in minor details, not departing from the spirit of my invention, so as best to construct a practical device for the purpose intended, as defined in the appended claim.

I claim:

A device of the kind described, comprising two semi-circular half-molds adapted to be locked together to form a complete circular mold; each half-mold, including an outer shell and two semi-circular channel irons hinged medially thereto; and means for drawing and locking the channel irons together laterally.

In testimony whereof I affix my signature.

JAMES L. MARTIN.

Witnesses:
CHAS. D. YOUNG,
R. D. SIMS.